United States Patent [19]

Hoo et al.

[11] Patent Number: 5,305,914
[45] Date of Patent: Apr. 26, 1994

[54] PRESSURIZED GAS BOTTLE DISCHARGE DEVICE

[75] Inventors: Edward S. Hoo, Stanhope; Robert J. Okken, Wayne, both of N.J.

[73] Assignee: Cartridge Actuated Devices, Inc., Fairfield, N.J.

[21] Appl. No.: 35,935

[22] Filed: Mar. 23, 1993

[51] Int. Cl.$^5$ .................................................. B67B 7/24
[52] U.S. Cl. .................................... 222/5; 137/68.2
[58] Field of Search ..................................... 222/3-5, 222/80-91; 280/737; 137/67-69; 169/28; 89/1.14; 220/89.2, 261

[56] References Cited

U.S. PATENT DOCUMENTS

| | | | |
|---|---|---|---|
| 1,854,477 | 4/1932 | McKissick | 137/68.1 |
| 2,365,364 | 12/1944 | Temple | 137/68.1 |
| 2,659,517 | 11/1953 | Reinhart, Jr. | 222/82 |
| 2,947,315 | 8/1960 | Connell | 137/68.2 X |
| 2,997,051 | 8/1961 | Williams | 222/5 X |
| 3,111,133 | 11/1963 | Fulton et al. | 222/5 X |
| 3,889,703 | 6/1975 | Keathley | 137/68.2 X |
| 4,288,005 | 9/1981 | Soo-Hoo | 222/5 X |
| 4,421,005 | 12/1983 | Byrne | 137/68.2 X |
| 4,570,658 | 2/1986 | Dean et al. | 137/68.2 |
| 4,619,284 | 10/1986 | Delarue et al. | 137/68.2 X |

Primary Examiner—Andres Kashnikow
Assistant Examiner—Kenneth DeRosa
Attorney, Agent, or Firm—Nolte, Nolte and Hunter

[57] ABSTRACT

A pyrotechnic device drives a ram to a stop. The ram cuts off the neck of a gas bottle which is received in an area below the ram stop. The ram is disposed over the open neck of the gas bottle and may provide gas channels through the ram or around the ram to selected outlets.

3 Claims, 2 Drawing Sheets

PRESSURIZED GAS BOTTLE DISCHARGE DEVICE

This invention relates to devices for opening pressurized gas bottles for rapid discharge of the contents and to the construction and arrangement of the parts thereof.

PRIOR ART

As noted in U.S. Pat. No. 4,288,005, known gas bottle discharge devices used some variety of puncture device for breaking a relatively thin seal at the end of the neck of the bottle. It was also known to use an explosively driven punch when a sudden release was desired.

The device of the U.S. Pat. No. 4,288,005 patent avoided the problems of unpredictable rate of discharge from such prior art devices and the forming of ice under certain environmental conditions by providing a device comprising a tubular body containing a slidable ram which received the neck of the bottle in a transverse bore. When the ram was moved by a pyrotechnic device from its first position to a second discharge position, the neck of the bottle is severed and the gas emerging from the bottle is transported around a groove at the end of the ram and discharged from the side of the tubular body at a rate determined by the dimensions of the groove and the openings in the side.

The constructions of the device of the U.S. Pat. No. 4,288,005 required the shifting of the ram with end of the neck of the bottle contained in it from a position intermediate the ends of the tubular body to a position at the end of the tubular body. Therefore, at least one area, the end of the tubular body with the ram in it, could not be used for gas discharge. Such a construction made the device of the prior art patent unuseable in some instances where the size of the discharge area was important.

There appears to have been no efforts in the prior art to improve the gas bottle discharge device of U.S. Pat. No. 4,288,005.

On the contrary, the Kinoshita patent, U.S. Pat. No. 4,955,635, discloses the continued use of a piercing pin to release propellant from a reservoir. The raft inflation valve of Wass, U.S. Pat. No. 4,549,870, incorporates a draw pin permitting a blocking piston, balanced by gas pressure, to move away from the outlet passage of the gas cylinder. Wass' valve disclosed in U.S. Pat. No. 4,595,374 also involves the movement of a balanced piston away from the outlet of a gas cylinder. Bement et al, U.S. Pat. No. 5,052,817, discloses ignitability test apparatus which, inter alia, releases the gases of combustion in a controlled manner. The inflator of U.S. Pat. No. 5,066,038 to Frantom uses a burst disc to release gases from a pressure vessel into a mixing chamber where the heated gases of combustion from a squibb increases the volume of the mixed gases which then enter a driver's side air bag.

SUMMARY OF THE INVENTION

The present invention involves a modification of the invention of the U.S. Pat. No. 4,288,005 patent to provide such a device with alternative areas of the tubular body for positioning outlet ports. To this end, the ram does not receive the neck of the bottle, but rather is constructed as a bottle neck cutter and positioner and including channel and port for directing the gas from the bottle to an outlet port at the end of the tubular body, beneath which, the ram-cutter has displaced or positioned the severed bottle neck. The device of the present invention is readily modified to either close the channel directing gas to the end of the tubular body or to substitute a ram without such a channel so that the gas from the bottle is directed to the side or sides of the tubular body. Also, alternatively, the outlet port at the end of the body may be closed when side ports are provided.

THE DRAWINGS

DETAILED DESCRIPTION OF THE DRAWINGS

Figure 1:
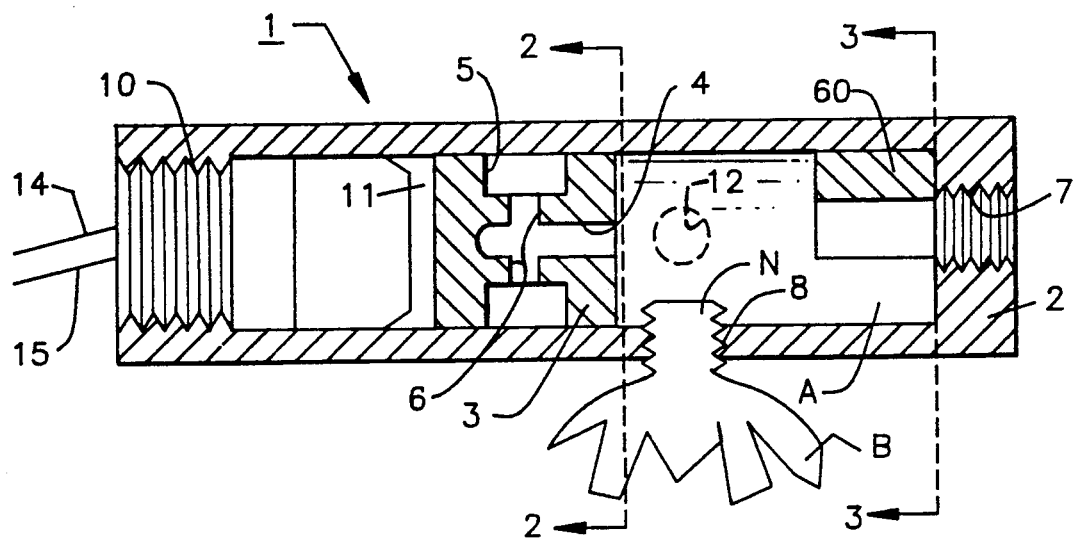
FIG. 1 is a diagrammatic elevational view partly in section of a discharge device of the invention showing the positional relationship of the parts before discharge.
Figure 2:
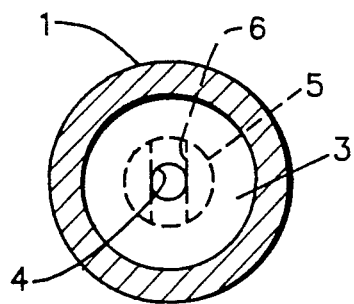
FIG. 2 is a diagrammatic cross sectional view taken in the plane 2—2 of FIG. 1.
Figure 3:
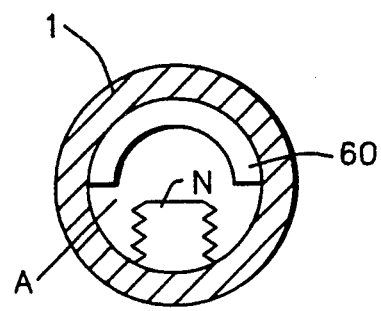
FIG. 3 is a diagrammatic cross sectional view taken along the line 3—3 in FIG. 1.

Referring to the figures, a tubular body 1 with an end wall 2 contains a ram cutter 3 with a bore 4 extending longitudinally and centrally from the cutting end of the ram to the pusher end where the bore ends short of the end edge of the pusher end. The cutter is reduced in size intermediate its ends to form a circumferential groove 5 about its central reduced portion.

A channel or bore 6 crosses bore 4 within the reduced portion of the ram cutter.

An aperture is provided at 8 in the lower wall of the body 1 as it appears in FIG. 1. This aperture 8 may be internally threaded to receive the threaded neck of the standard gas bottle B.

A ram cutter stop 60 is disposed in the tubular body adjacent to and partially surrounding the outlet port 7 of the device. It is noted that the cutter stop is fabricated to leave an area A below it and the outlet port 7 to receive the severed portion of the bottle neck after it has been cut.

Figure 4:
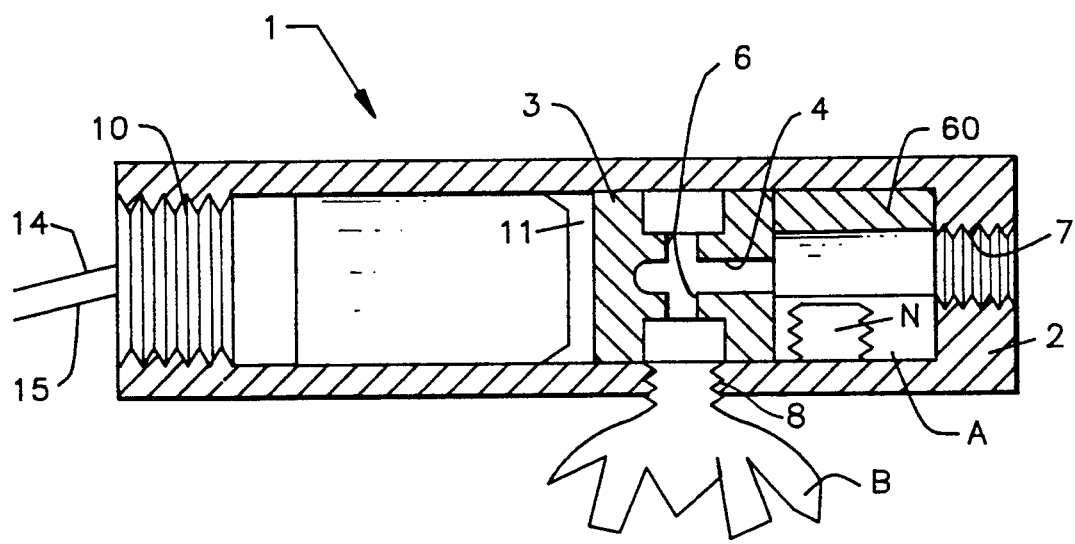
FIG. 4 is a view similar to FIG. 1, but showing the positional relationship of the parts after discharge is initiated.

A pyrotechnic cartridge 10 of known type is secured as by threading into the left-hand end of the body 1 as viewed in FIGS. 1 and 4. The end of the cartridge is spaced from an expanding seal 11 which abuts against the pusher side of the ram cutter. The expanding seal is of a known type and is fabricated of teflon or nylon. It has a circumferential wall extending from its outer edge to a base.

Conductors 14 and 15 are connected through a wall of the pyrotechnic cartridge and lead to firing means inside the cartridge 11 and are connected to an electrical source, not shown.

Upon electrical energization, the cartridge 10 fires driving the expanding seal and ram cutter to the right-hand position as shown in FIG. 4, against cutter stop 6. The end of the neck N of the bottle is sheared off and is rammed to its position below the outlet port 7. Gas enters groove 5 and is forced through channels 6 and 4 towards and out output port 7.

Alternatively, the outlet port 7 may be plugged and outlet ports may be provided on the sides of the housing in the vicinity of the reduced portion of the ram cutter, when the ram cutter is driven against the stop 6. One of the alternate ports 12 are depicted in phantom in FIG. 1 only. In such an instance, the channeled ram of the drawings may still be used or replaced with a ram having a solid intermediate portion.

Combustion products from the pyrotechnic cartridge are confined within the body by the expanding seal.

We claim:

1. Apparatus for discharging a gas bottle, comprising:
   (a) a tubular body having a longitudinal axis, a proximal end and a distal end wall and provided with a transversely facing orifice for receiving the neck of a gas bottle and for disposing the end of the neck within the confines of said tubular body;
   (b) a ram slidably disposed inside said tubular body and having a cutting end facing the distal end wall of said tubular body and a pusher end facing the proximal end of said tubular body and an intermediate portion forming a circumferential groove between said ram ends, said ram pusher and cutter being slidable from a first position with said cutting end on the proximal side of said transversely facing orifice to a second position with said circumferential groove overlying said transversely facing orifice;
   (c) a pyrotechnic device secured within said proximal end of said tubular body and for driving when fired said ram from said first to said second position;
   (d) means for stopping the movement of said ram disposed radially of the longitudinal axis of said tubular body and on the distal side of the orifice and extending inwardly from the distal end wall of said tubular body; and
   (e) means for receiving the end of the neck of the gas bottle cut from the bottle as said ram is driven from said first to said second position, said receiving means being disposed radially of the longitudinal axis of said tubular body and on the distal side of the orifice and extending inwardly from the distal end of said tubular body 180 degrees opposite to the position of said ram stopping means.

2. The apparatus of claim 1 wherein said distal end wall of said body has a gas outlet aperture extending along the longitudinal axis of said tubular body and channel means are provided in said ram between said intermediate portion of said ram and said cutting end of said ram.

3. The apparatus of claim 1 wherein said tubular body is provided with transverse port means opening into said intermediate portion of said ram when said ram is in said second position.

* * * * *